(12) United States Patent
Arrouy et al.

(10) Patent No.: US 9,557,447 B2
(45) Date of Patent: Jan. 31, 2017

(54) METHOD FOR THE ADDITION OF A FUNCTIONAL COATING ON AN OPTICAL SURFACE OF A SPECTACLE LENS SUITABLE TO BE ARRANGED IN A SPECTACLE FRAME

(71) Applicant: Essilor International (Compagnie Generale d'Optique), Charenton-le-Pont (FR)

(72) Inventors: Frederic Arrouy, Charenton-le-Pont (FR); Philip Miller, Charenton-le-Pont (FR)

(73) Assignee: ESSILOR INTERNATIONAL (COMPAGNIE GENERALE D'OPTIQUE), Charenton-le Pont (FR)

(*) Notice: Subject to any disclaimer, the term of this patent is extended or adjusted under 35 U.S.C. 154(b) by 37 days.

(21) Appl. No.: 13/901,941

(22) Filed: May 24, 2013

(65) Prior Publication Data
US 2013/0316071 A1    Nov. 28, 2013

(30) Foreign Application Priority Data

May 24, 2012  (EP) ..................... 12305575

(51) Int. Cl.
| G02B 1/10 | (2015.01) |
| G02C 7/10 | (2006.01) |
| G02B 27/00 | (2006.01) |
| G02B 1/11 | (2015.01) |
| G02B 1/14 | (2015.01) |
| G02B 1/18 | (2015.01) |

(52) U.S. Cl.
CPC ............... *G02B 1/10* (2013.01); *G02B 1/105* (2013.01); *G02B 1/11* (2013.01); *G02B 1/14* (2015.01); *G02B 1/18* (2015.01); *G02B 27/0012* (2013.01); *G02C 7/10* (2013.01)

(58) Field of Classification Search
CPC ............ G02B 1/10; G02B 1/105; G02B 1/11; G02B 27/0012; G02C 13/001; G02C 7/02–7/028; B29D 11/00–11/00028
USPC .......................... 427/162–169, 402
See application file for complete search history.

(56) References Cited

U.S. PATENT DOCUMENTS

| 6,129,042 A * | 10/2000 | Smith et al. ............. 118/694 |
| 2005/0008784 A1 * | 1/2005 | Martin et al. ............. 427/393.4 |
| 2012/0021135 A1 * | 1/2012 | Yajima ............. 427/521 |
| 2012/0196036 A1 * | 8/2012 | Yajima ............. 427/162 |

* cited by examiner

*Primary Examiner* — Elizabeth Burkhart
(74) *Attorney, Agent, or Firm* — Young & Thompson

(57) ABSTRACT

Implementations described and claimed herein provide systems and methods for adding a chosen functional coating on an optical surface of a spectacle lens. In one implementation, it is determined if identified features of the optical surface of the spectacle lens are compatible with the chosen functional coating according to a first set of rules. The features of the optical surface are identified based on an analysis of a quality of the optical surface. Manufacturing information for the chosen functional coating is generated based on the determined compatibility. The manufacturing information includes information for depositing the chosen functional coating on the optical surface where the identified features are compatible with the chosen functional coating and on a modified optical surface where the identified features are not compatible with the chosen functional coating.

20 Claims, 2 Drawing Sheets

METHOD FOR THE ADDITION OF A FUNCTIONAL COATING ON AN OPTICAL SURFACE OF A SPECTACLE LENS SUITABLE TO BE ARRANGED IN A SPECTACLE FRAME

CROSS-REFERENCE TO RELATED APPLICATION

The present application claims priority to European Patent Application No. 12305575.8 filed May 24, 2012. The European application is hereby incorporated by reference in its entirety for all that it discloses and teaches.

FIELD OF THE INVENTION

The invention relates to a method for the addition of a functional coating on an optical surface of a spectacle lens suitable to be arranged in a spectacle frame.

The invention further relates to a computer program product and a computer readable medium.

BACKGROUND OF THE INVENTION

It is well-known that lenses, and in particular spectacle lenses, comprise an ophthalmic substrate having geometrical features adapted to the wearer.

It is a common practice in the art to coat at least one main surface of the ophthalmic substrate with several coatings for imparting to the finished lens additional or improved optical, mechanical properties and/or surface chemistry. These coatings are designated in general as functional coatings.

Thus, it is usual practice to add functional coatings, for instance an anti-abrasive coating to increase the abrasion resistance of the lens, an anti-reflective coating to decrease the reflection of light and an anti-soiling coating applied over the anti-reflective coating. The anti-soiling coating provides an outer coating that can be more resistant to contamination for instance by organic impurities and more easily cleaned than the anti-reflective coating. The anti-soiling coating furthermore protects the anti-reflective coating.

Furthermore, the wearer of the lens can wish to replace or review such an anti-soiling coating because the effects of said coating can decrease over time.

Other coatings such as a polarized coating, a photochromic or a dyeing coating may also be applied onto one or both surfaces of the lens substrate.

Another example of coatings is an anti-fog coating which can provide an anti-fog function for a temporary need, for example in winter period.

In consequence, there is a need for a method suitable for the addition of a functional coating on an optical surface of a spectacle lens in a delayed way after their design and their arrangement in a spectacle frame or at the request of the wearer. More particularly there is a need for a method suitable for the addition of a functional coating on an optical surface of a spectacle lens after their manufacturing or design and their arrangement in a spectacle frame, or at the request of the wearer to upgrade or modify their performance characteristics.

In view of the fast development in the top coat technology, it would be of interest to be able to safely add or replace an initially deposited top coat by a new top coat having different or improved properties.

So, the invention is directed to a method for loading or reloading a functional coating on an optical surface of a spectacle lens. This method is simple and can be implemented by a single compact machine in order to be placed at an eye care practitioner's premises and used directly by the eye care practitioner (ECP).

SUMMARY OF THE INVENTION

The aim of the present invention is to propose a method making it possible to add at least a functional coating by the deposit of corresponding treatments on an existing pair of spectacle lenses at an eye care practitioner's premises.

One of the objectives of the invention is to work directly on complete eyeglass equipment (lenses assembled in a spectacle frame) without removing the lenses from the spectacle frame in order to avoid all risks of damaging the lens and/or the frame.

This objective is achieved with a method for the addition of a functional coating on an optical surface of a spectacle lens suitable to be arranged in a spectacle frame, said method comprising the following steps:
  providing a first set of rules suitable to determine if the features of an optical surface chosen within a list of features are compatible with a functional coating chosen within a list of functional coatings, and a second set of rules to determine a modified optical surface if features of an optical surface and a functional coating are not compatible;
  providing said spectacle lens;
  choosing within the list of functional coatings a functional coating to be added on said optical surface;
  analysing the quality of the optical surface and identifying the features of the optical surface;
  determining thanks to the first set of rules if the features of the optical surface and the chosen functional coating are compatible;
  if the optical surface has features compatible with the chosen functional coating, depositing the chosen functional coating on the optical surface;
  if the optical surface has features not compatible with the chosen functional coating, forming a modified optical surface which is compatible with the chosen functional coating determined thanks to the second set of rules and depositing the chosen functional coating on the modified optical surface.

The present invention also relates to a method of adding a functional coating on an optical surface of a spectacle lens suitable to be arranged in a spectacle frame, where said method provides manufacturing information to a lens coating machine and comprises following steps:
  providing said spectacle lens;
  choosing within a list of functional coatings a functional coating to be added on said optical surface;
  analysing the quality of the optical surface and identifying the features of the optical surface;
  determining thanks to a first set of rules if the features of the optical surface and the chosen functional coating are compatible;
  if the optical surface has features compatible with the chosen functional coating, providing to the lens coating machine manufacturing information suitable to produce the chosen functional coating on the optical surface;
  if the optical surface has features not compatible with the chosen functional coating, providing to the lens coating machine manufacturing information suitable to produce a modified optical surface which is compatible with the chosen functional coating determined thanks to a second set of rules and providing to the lens coating machine manufacturing information suitable to produce the chosen functional coating on the modified optical surface.

According to an embodiment of said method, one previously provides a first set of rules suitable to determine if the features of an optical surface chosen within a list of features are compatible with a functional coating chosen within a list of functional coatings, and a second set of rules to determine a modified optical surface if features of an optical surface and a functional coating are not compatible.

By spectacle lens suitable to be arranged in a spectacle frame, it is understood that said lenses are yet mounted in a spectacle frame, or are suitable to be arranged in a spectacle frame. In a preferred embodiment of the invention, this method is applied to a spectacle lens which is mounted in a spectacle frame. Accordingly, a spectacle lens according to the present invention has already been put to the form of a given spectacle frame in a step prior to the process of the invention. The said lens has for example previously been cut to the form of the given spectacle frame. The said lens can also have been previously directly manufactured to fit the form of the given spectacle frame. Thus, for any lens according to the invention, neither a step of edging nor a step of cutting of the lens to the shape of the given frame is needed to mount it into the said frame; indeed, either the said lens is already mounted in the given frame or the said lens has already the shape suitable to be mounted on the given frame. Such can be the case for lenses which were dismounted from a frame prior to the process of the invention.

Thanks to the present invention, it is now possible to grant a wearer's request by the addition of at least a functional coating chosen by the wearer directly at an eye care practitioner's premises equipped with a machine adapted to carry out this method. It is also very convenient for the eye care practitioner and the coating/recoating is faster than to return lenses at manufacturing to carry out this addition which can be a temporary need for the wearer, for example an anti-fog coating in winter period.

The present invention can be for example implemented in an eye care practitioner premise or a spectacle lens retailer shop.

Wearers can then easily change the features of theirs spectacle lenses and adapt them rapidly according to their needs. According to an example, a wearer can order lenses without any coating and finally decides to add a functional coating; he can also buy spectacles where no functional coating is initially added, such as for example commercial solar spectacles or commercial reader spectacles, and then ask for adding a desired functional coating. According to another example, he can change or amend an existing coating on his spectacle lenses.

According to an embodiment, the method is implemented by technical means, as for example by computer means controlling such a machine.

According to an embodiment, the determining step of the present method, where one determines thanks to the first set of rules if the features of the optical surface and the chosen functional coating are compatible, is implanted by computer means.

According to various embodiments that can be combined according to all the possible combinations:

the list of functional coatings consists of an anti-soiling coating, an anti-reflective coating, an anti-dust coating, an anti-fog coating, a water repellent coating, an anti-scratch coating, an impact-resistant coating, an interferential filter, a tinted coating, a mirror coating, a photochromic coating, a polarized coating, a filter coating, and a combination of any of preceding compatible coatings;

the features of an optical surface is chosen within the list consisting of chemical composition of the optical surface, nature of the optical surface, type of material on the surface of the optical surface wherein the type of material is selected within the list consisting of metal oxide, silica, varnish;

the nature of the optical surface is chosen within the list consisting of an anti-soiling material, an anti-reflective material, an anti-dust material, an anti-fog material, a water repellent material, an anti-scratch material, an impact-resistant material, an interferential filter, a tinted material, a mirror material, a photochromic material, a polarizing material, a filter material, and a combination of any of preceding compatible material;

the first set of rules suitable to determine if the features of an optical surface chosen within a list of features are compatible with a functional coating chosen within a list of functional coatings is an incidence matrix showing the relationship between the features of the list of features and the functional coatings of the list of functional coatings;

the first set of rules is a list of features associated with a list of functional coatings, each couple of features and functional coating being associated with a Yes/No parameter regarding compatibility of the functional coating on an optical surface having said features;

the second set of rules is a list of modified optical surface associated with a list of couples of features and functional coating, each triplet of a modified optical surface, features and a functional coating being associated with a Yes/No parameter regarding both the compatibility of the modified optical surface on an optical surface having said features and the compatibility of the functional coating on the modified optical surface;

the spectacle lens is arranged in a spectacle frame;

said method further comprises the following steps:
  protecting the frame before depositing the chosen functional coating, and
  removing the protection from the frame after depositing the chosen functional coating;

said method further comprises a step for controlling and evaluating the performance of the deposited functional coating;

analysing the quality of the optical surface comprises a step for detecting, quantifying and localising defects on the optical surface;

defects are chosen within a list consisting of scratch, crack, break, chip;

analysing the quality of the optical surface and identifying the features of the optical surface is chosen within a list of analysis methods consisting of:
  visual observation,
  using a camera,
  using a spectrophotometer,
  using a conductimeter being able to measure the conductivity of the optical surface,
  identifying on the spectacle lens marks corresponding to the features of the optical surface,
  a combination of any of preceding analysis methods;

forming a modified optical surface which is compatible with the chosen functional coating comprises a step for depositing a primer coating depending on the chosen functional coating to be added and on the optical surface; and said method further comprises a step of plasma treatment before forming a modified optical surface which is compatible with the chosen functional coating comprises a step for depositing a primer coating depending on the chosen functional coating to be added and on the optical surface.

Furthermore, the invention also proposes a computer program product comprising one or more stored sequence of instructions that is accessible to a processor and which, when executed by the processor, causes the processor to carry out the steps of the different embodiments of the preceding method.

The invention also proposes a computer readable medium carrying out one or more sequences of instructions of the preceding computer program product.

BRIEF DESCRIPTION OF THE DRAWINGS

Further features and advantages of the invention will appear from the following description of embodiments of the invention, given as non-limiting examples, with reference to the accompanying drawings listed hereunder.

Elements in the figures are illustrated for simplicity and clarity and have not necessarily been drawn to scale. For example, the dimensions of some of the elements in the FIG. 1 may be exaggerated relative to other elements to help improving the understanding of the embodiments of the present invention.

DETAILED DESCRIPTION OF THE INVENTION

The present invention applies for all kind of spectacle lenses suitable to be arranged in a spectacle frame. So, all the spectacle lenses have already been previously cut to the form of the spectacle frame. Preferentially spectacle lenses are mounted in a spectacle frame.

The spectacle lens typically comprises an optical substrate (i.e., base lens) made of an optically transparent material, such as mineral glass or organic material and having at least one of its main surfaces coated, successively, with an impact-resistant coating layer (impact resistant primer), an abrasion- and/or scratch-resistant coating layer (hard-coat), an anti-reflective coating layer, and anti-soiling coating layer (hydrophobic and/or oleophobic top coat). Other coating layer such as a polarized coating layer, a photochromic or a dyeing coating may also be applied onto one or both surfaces of the spectacle lens, these kinds of coating layer being applied as a coating or through a functionalized film. In other case, the spectacle lens comprises only an optical substrate without any kind of coating on each side, this kind of spectacle lens being well known as "bare-lens".

Then it could be understood that the optical substrate represents a mineral or a thermoplastic or thermoset optical base lens selected from the group consisting of a finished lens, a semi-finished lens, a progressive addition lens (PAL), an afocal lens, a plano lens, a unifocal lens, and a multifocal lens.

Figure 1:
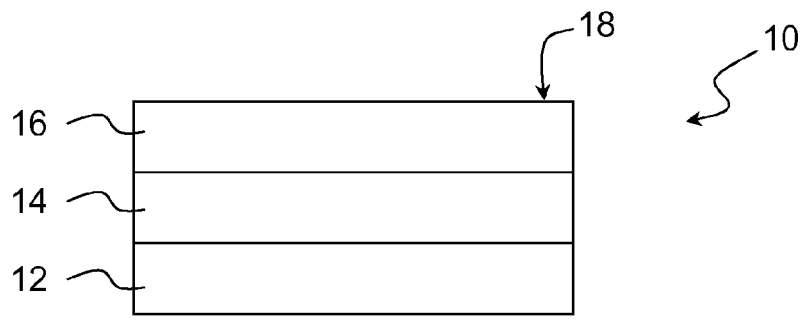
FIG. 1 is a schematic side view of a spectacle lens suitable to be arranged in a spectacle frame.

FIG. 1 shows an example of a spectacle lens 10 suitable to be arranged in a spectacle frame which comprises an optical substrate 12 and at least a functional coating 14, 16.

For example, an antireflective coating 14 can be disposed on a surface of the optical substrate 12, and a previously applied, silicon containing, antisoiling coating 16 can be disposed on the antireflective coating 14. The antireflective coating 14 is between the optical substrate 12 and the antisoiling coating 16.

Other coatings such as, for example, scratch resistant coatings can be present between the optical substrate 12 and the antireflective coating 14.

An optical surface 18 of the spectacle lens 10 is defined by the optical surface of the existing outermost coating layer deposited on the optical substrate 12 of the spectacle lens. If the spectacle lens has no functional coating on the optical substrate 12, the optical surface 18 is one of the main surfaces of the optical substrate 12.

The existing outermost coating layer can be of organic nature. By organic nature, it is meant a layer which is comprised of at least 30% by weight, preferably at least 40%, and more preferably at least 50% by weight of the total weight of the coating layer of organic materials.

For instance, an existing outermost coating layer can be a hydrophobic and/or oleophobic top coat, and preferably such a top coat made from a composition comprising at least one fluorinated compound. Such fluoro compounds may be for example silanes and silazanes bearing at least one group selected from fluorocarbons, polyfluorocarbons, fluoropolyethers and polyfluoropolyethers. Such top-coat represents an anti-soiling coating, which is also common cited as anti-smudge-coating or anti-fouling coating.

Another example of an existing outermost coating layer is an anti-reflecting coating as well known in the art. The anti-reflecting coating can be any layer or stack of layers which improve the anti-reflective properties of the finished lens.

The anti-reflective coating may preferably consist of a mono or multilayer film of dielectric materials such as SiO, $SiO_2$, $Si_3N_4$, $TiO_2$, $ZrO_2$, $La_2O_3$, $MgF_2$ or $Ta_2O_5$ or mixtures thereof.

It is well-known that the anti-reflecting coating is preferably a multilayer film comprising three or more dielectric material layers of alternatively high and low refractive indexes.

As already indicated, the spectacle lens 10 can comprise a scratch-resistant (or anti-scratch) coating layer, the anti-reflective coating layer being typically deposited on the scratch-resistant coating layer.

Any known optical scratch-resistant coating composition can be used to form the scratch-resistant coating. Thus, the scratch-resistant coating composition can be a UV and/or a thermally curable composition.

By definition, a scratch-resistant coating is a coating which improves the abrasion resistance of the finished optical article as compared to a same optical article but without the scratch-resistant coating.

Preferred scratch-resistant coatings are those made by curing a precursor composition including epoxyalkoxysilanes or a hydrolyzate thereof and a curing catalyst. The scratch resistant coatings may contain at least one inorganic filler such as $SiO_2$ and/or metal oxides colloids. Other kind of scratch-resistant coatings are based on polyacrylate or polymethacrylate chemistry which could also contain an inorganic filler as mentioned hereinbefore.

As already indicated, the spectacle lens 10 can comprise an impact-resistant coating layer, the scratch-resistant coating layer being typically deposited on the impact-resistant coating layer.

By definition, an impact-resistant coating is a coating which improves the impact resistance of the finished spectacle lens as compared with the same spectacle lens but without the impact-resistant primer coating. Typical primer coatings are (meth)acrylic based coatings and latex polyurethane based coatings.

The primer coating composition can be applied using any classical method such as spin, dip or flow coating. Depending upon the nature of the impact-resistant coating composition, thermal curing, UV-curing or a combination of both can be added.

Figure 2A:
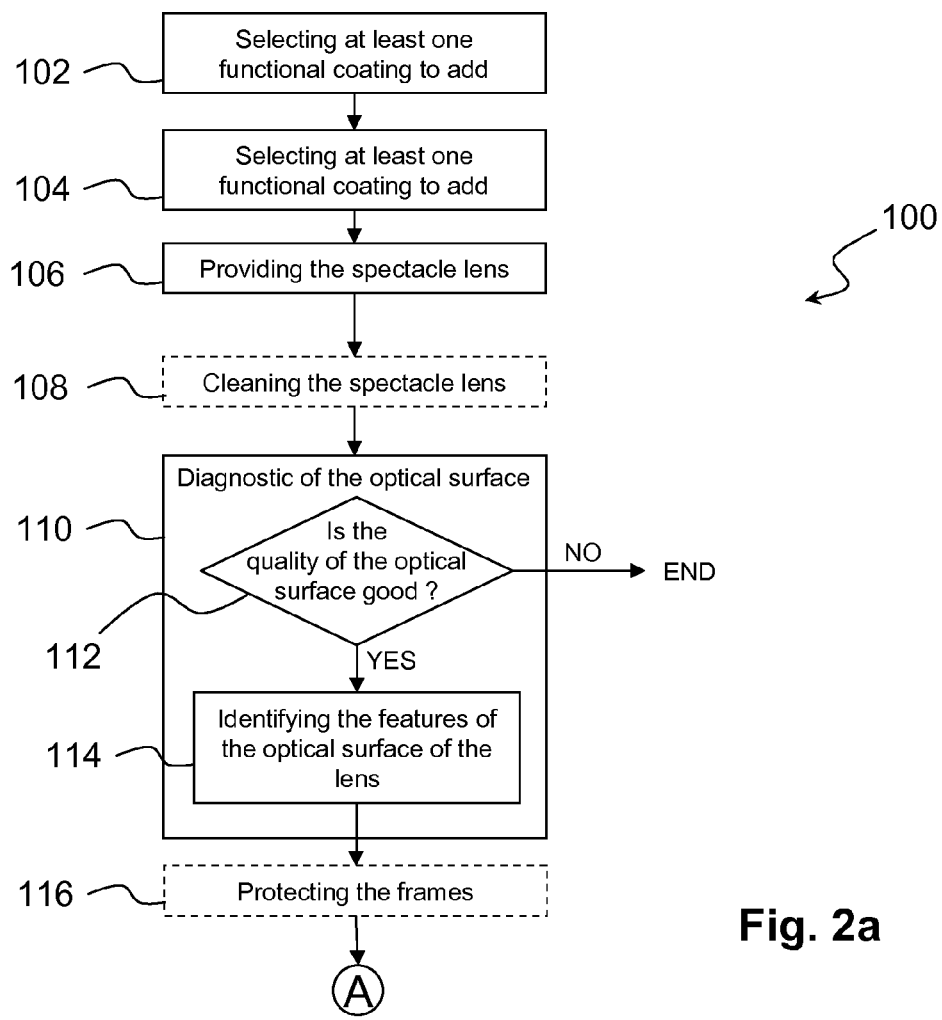
FIGS. 2a, 2b are an exemplary flowchart illustrating steps of the method according to the invention for the addition of a functional coating on an optical surface of a spectacle lens.
Figure 2B:
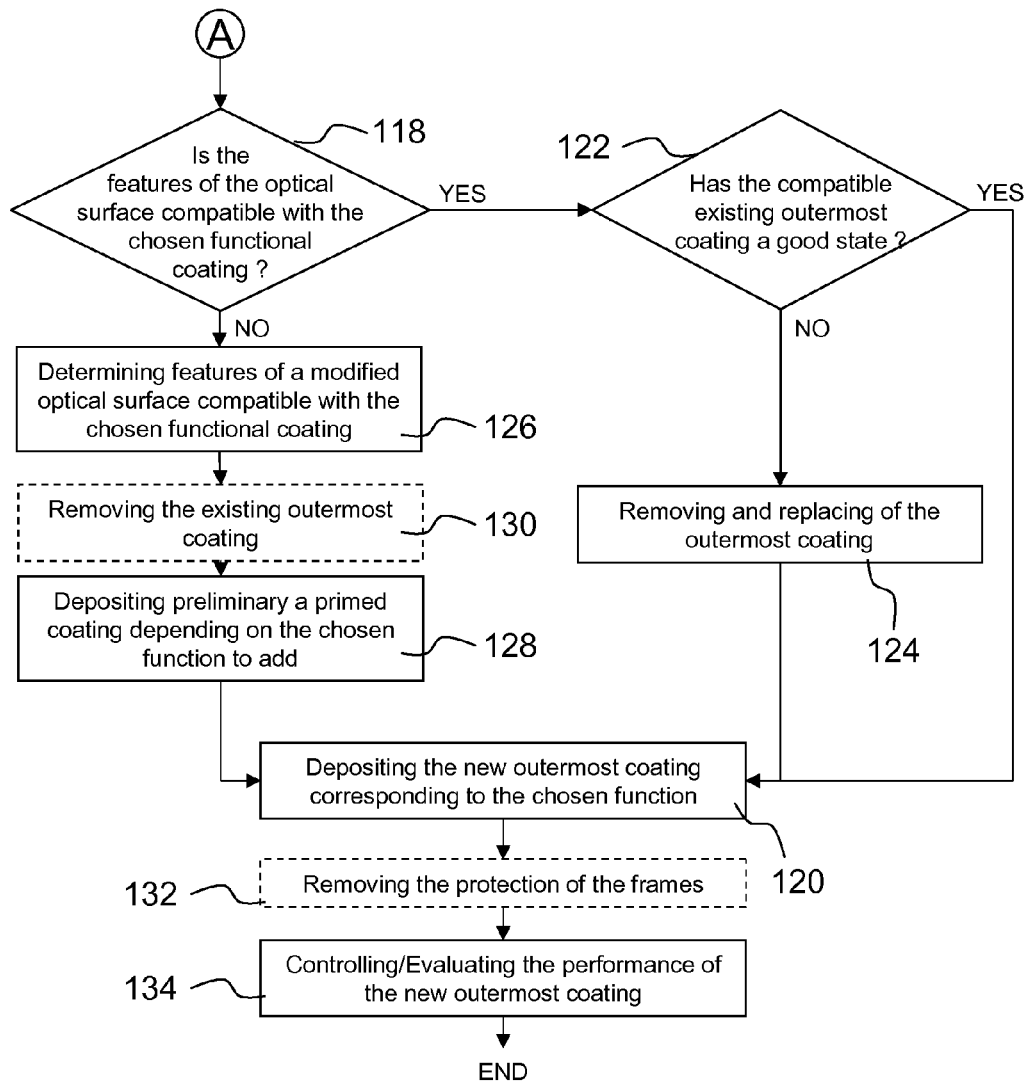

Now, the method 100 for the addition of a functional coating on an optical surface of a spectacle lens suitable to be arranged in a spectacle frame according to the invention will be described in details with reference to FIG. 2.

Said method 100 comprises a step 102 for providing sets of rules.

A first set of rules is suitable to determine if the features of an optical surface chosen within a list of features are compatible with a functional coating chosen within a list of functional coatings.

The list of functional coatings consists of an anti-soiling coating, an anti-reflective coating, an anti-dust coating, an anti-fog coating, a water repellent coating, an anti-scratch coating, an impact-resistant coating, an interferential filter, a tinted coating, a mirror coating, a photochromic coating, a polarized coating, a filter coating, and a combination of any of preceding compatible coatings.

The features of an optical surface is chosen within the list consisting of chemical composition of the optical surface, nature of the optical surface, type of material on the surface of the optical surface wherein the type of material is selected within the list consisting of metal oxide, silica, varnish, paint.

The nature of the optical surface is chosen within the list consisting of an anti-soiling/anti-smudge material, an anti-reflective material, an anti-dust material, an anti-fog material, a water repellent material, an anti-scratch material, an impact-resistant material, an interferential filter, a tinted material, a mirror material, a photochromic material, a polarizing material, a filter material and a combination of any of preceding compatible material.

The first set of rules is a list of features associated with a list of functional coatings, each couple of features and functional coating being associated with a Yes/No parameter regarding compatibility of the functional coating on an optical surface having said features.

For example, the first set of rules is an incidence matrix showing the relationship between the features of the list of features and the functional coatings of the list of functional coatings. As example, an anti-soiling coating can be deposited on a lens that has a solgel or an inorganic layer such as a $SiO_2$. If we want to deposit the topcoat on another surface that has no Si—O groups or low amount of it, the adhesion of the topcoat is low or none existent.

Then, an anti-soiling coating and an anti-reflective coating represent a couple of feature and functional coating, respectively, which are compatible.

On the opposite, for example, an anti-soiling coating and an organic bare-lens represent a couple of feature and functional coating, respectively, which are not compatible.

As same manner, an anti-soiling coating and a scratch resistant coating based on epoxysilane chemistry represent a couple of feature and functional coating, respectively, which are compatible.

On the opposite, an anti-soiling coating and an impact-resistant coating based on latex chemistry represent a couple of feature and functional coating, respectively, which are not compatible.

A second set of rules is suitable to determine a modified optical surface if features of an optical surface and a functional coating are not compatible.

The second set of rules is a list of modified optical surface associated with a list of couples of features and functional coating. Each triplet of a modified optical surface, features and a functional coating is associated with a Yes/No parameter regarding both the compatibility of the modified optical surface on an optical surface having said features and the compatibility of the functional coating on the modified optical surface. A modified optical surface may be another coating and/or a treatment of a functional coating to provide it compatible with features. Such treatment may be chemical or physical treatment, like for example, corona or plasma treatment which are well known as activated surface treatment.

For example, as mentioned in FR 2 954 833, the following triplet could be one element of matrix usable for the second set of rules: an anti-scratch coating layer as functional coating, a silica layer as a modified optical surface, and an anti-fog coating layer as a feature coating.

Furthermore, said method 100 comprises a step 104 for selecting by the wearer at least one functional coating to add on its spectacle lens. The wearer chooses the functional coating within the list of functional coatings a functional coating to be added on said optical surface.

Moreover, said method comprises a step 106 for providing the spectacle lens.

Optionally, the spectacle lens is then cleaned in 108 with, for example, a duster or in an ultrasonic bath.

Then, a diagnostic of the spectacle lens is carried in 110.

During this diagnostic, the quality of the optical surface is analysed in 112 and the features of the optical surface are identified in 114.

Analysing the quality of the optical surface comprises a step for detecting, quantifying and localising defects on the optical surface. For instance, defects are scratches, cracks, breaks and/or chips.

Moreover, analysing the quality of the optical surface and identifying the features of the optical surface is chosen within a list of analysis methods consisting of visual observation, using a camera, using a spectrophotometer, using specific device which are able to measure or identify a specific physical parameter (such device could be for example a conductimeter which could be able to measure the conductivity of the optical surface and then identify if the functional coating is an anti-dust coating; such device could be also demonstrators which are currently used by optician to demonstrate to the wearer the interest and/or the presence of such kind of functional coating. Demonstrators exist for example to demonstrate the presence on a lens of an anti-reflective coating, a polarized coating, a photochromic coating, an anti-dust coating, and an anti-soiling coating), identifying on the spectacle lens marks corresponding to the features of the optical surface or a combination of any of preceding analysis methods.

If the quality of the optical surface of the spectacle lens is not good enough so that a new coating is deposited above, the method stops.

Identifying the features of the optical surface 18 is a necessary step to determine if the optical surface has features compatible with the chosen functional coating.

Then, if the spectacle lens is arranged in a spectacle frame, the method comprises an optionally step 116 for protecting the frame before depositing a new coating and particularly the chosen functional coating.

The method further comprises a step 118 for determining thanks to the first set of rules if the features of the optical surface and the chosen functional coating are compatible.

If the optical surface has features compatible with the chosen functional coating, the chosen functional coating is deposited on the optical surface in 120.

Before the step 120 for depositing the chosen functional coating on the optical surface, a step 122 for verifying the good state of the existing outermost coating defining the optical surface could be carried out. If the state is not good enough to deposit the chosen functional coating, the outermost coating is removed and replaced by a new coating which has the same features as the removed outermost coating in 124.

For example, the spectacle lens is treated in a plasma under vacuum conditions to remove the outermost coating and then a new coating having the same features as the removed outermost coating is applied.

If the optical surface has features not compatible with the chosen functional coating, a modified optical surface which is compatible with the chosen functional coating is determined thanks to the second set of rules in 126 in order to form a modified optical surface compatible with the chosen functional coating in 128.

Then, forming the modified optical surface comprises a step for depositing a primer coating depending on the chosen functional coating to be added and on the optical surface preceded by a step of plasma treatment. This step can be preceded by a step for removing the existing outermost coating in 130. The primer coating layer could be a coating comprising for example, silica atom which could be able to form silane or silanol function, to improve the adhesion between the optical surface and the chosen functional coating like an anti-soiling coating or an anti-fog coating.

Then, the chosen functional coating is deposited on the modified optical surface in 120.

Sometimes, it is necessary to carry out a pre-treatment before depositing the chosen functional coating on the optical surface or on the modified optical surface.

For example, it is necessary to carry out a pre-treatment before the depositing of an anti-soiling coating on an anti-reflective coating. In this case, the pre-treatment can be an energetic treatment required to activate the adherence properties of the anti-reflective coating, for instance a vacuum plasma treatment.

It shall be understood that, in pre-treatment step, almost the entire surface of the lens and preferably the whole surface of the lens is treated.

By definition, the duration of the pre-treatment is the time during which the surface of the existing outermost coating is in the presence of the activated treatment.

For example, the treatment with activated chemical species is corona discharge treatment and atmospheric pressure plasma treatment, in particular corona discharge treatment.

In the case where the chosen functional coating is an anti-reflecting coating, it is a common practice in the art that the anti-reflecting coating can be applied in particular by vacuum deposition according to one of the following techniques: by evaporation, optionally ion beam assisted, by spraying using an ion beam, by cathode sputtering, or by plasma assisted vapor-phase chemical deposition.

In the case where the chosen functional coating is a scratch-resistant coating, it is usual practice that the scratch-resistant coating composition can be applied using any classical method such as spin, dip or flow coating. For example, the scratch-resistant coating composition can be simply dried or optionally pre-cured before application of the subsequent anti-reflecting coating. Depending upon the nature of the scratch-resistant coating composition thermal curing, UV-curing or a combination of both can be added.

Then, after the depositing of the chosen functional coating, an optionally step 132 is carried out for removing the protection from the frame after depositing the chosen functional coating if the spectacle frame has been protected in step 116.

Then, a step 134 for controlling and evaluating the performance of the deposited functional coating is carried out.

Furthermore, the invention also relates to a computer program product comprising one or more stored sequence of instructions that is accessible to a processor and which, when executed by the processor, causes the processor to carry out the steps of the different embodiments of the preceding methods.

The invention also proposes a computer readable medium carrying out one or more sequences of instructions of the preceding computer program product.

Unless specifically stated otherwise, as apparent from the following discussions, it is appreciated that throughout the specification discussions utilizing terms such as "evaluating", "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

It should be noted more generally that the invention is not limited to the examples described and represented.

The invention claimed is:

1. A method for adding a chosen functional coating on an optical surface of an existing spectacle lens where the features of said optical surface are unknown, the method being implemented in an eye care practitioner's premises or a spectacle lens retailer shop, the method comprising successive steps of:
   providing the existing spectacle lens arranged in a spectacle frame;
   carrying out a diagnostic step of the existing spectacle lens prior removing any existing coating of said existing spectacle lens and prior adding the chosen functional coating on an optical surface and wherein the quality of the optical surface is analyzed and the features of the optical surface are identified;
   determining, thanks to the diagnostic step, if identified features of the optical surface of the existing spectacle lens are compatible with the chosen functional coating according to a first set of rules using a processor, the features of the optical surface identified based on an analysis of a quality of the optical surface, the first set of rules including an incidence matrix having a list of a plurality of optical surface features associated with a list of a plurality of functional coatings; and
   generating manufacturing information for the chosen functional coating based on the determined compatibility, the manufacturing information including information for depositing the chosen functional coating on the optical surface where the identified features are compatible with the chosen functional coating and on a modified optical surface where the identified features are not compatible with the chosen functional coating.

2. The method of claim 1, wherein each of the associated functional coatings and optical surface features being associated with a parameter regarding a compatibility of the functional coating with the optical surface features.

3. The method of claim 1, wherein the modified optical surface is determined according to a second set of rules.

4. The method of claim 3, wherein the second set of rules includes a list of modified optical surfaces associated with a list of pairs of optical surface features and functional coatings, each of the associated pairs and modified optical surfaces being associated with a parameter regarding a compatibility of the associated modified optical surface with the optical surface features and a compatibility of the functional coatings with the associated modified optical surface.

5. The method of claim 1, wherein the chosen functional coating includes at least one of: an anti-soiling coating, an anti-reflective coating, an anti-dust coating, an anti-fog coating, a water repellent coating, an anti-scratch coating, an impact-resistant coating, an interferential filter, a tinted coating, a mirror coating, a photochromic coating, a polarized coating, or a filter coating.

6. The method of claim 1, wherein the identified features include at least one of a chemical composition of the optical surface, a nature of the optical surface, or a type of material on the optical surface.

7. The method of claim 6, wherein the type of material on the optical surface includes at least one of: metal oxide, silica, or varnish.

8. The method of claim 6, wherein the nature of the optical surface includes at least one of: an anti-soiling material, an anti-reflective material, an anti-dust material, an anti-fog material, a water repellent material, an anti-scratch material, an impact-resistant material, an interferential filter, a tinted material, a mirror material, a photochromic material, a polarizing material, or a filter material.

9. The method of claim 1, wherein the analysis of the quality of the optical surface comprises:
   detecting one or more defects on the optical surface;
   quantifying the defects, and
   localising the defects.

10. The method of claim 9, wherein the one or more defects include scratches, breaks, and chips.

11. The method of claim 1, wherein the analysis of the quality of the optical surface is obtained using at least one of: visual observation, a camera, a spectrophotometer, a conductimeter configured to measure a conductivity of the optical surface, or an identification of marks on the spectacle lens corresponding to the identified features.

12. One or more tangible non-transitory computer-readable storage media storing computer-executable instructions for performing a computer process on a computing system, for a method for adding a chosen functional coating on an optical surface of an existing spectacle lens where the features of said optical surface are unknown, the method being implemented in an eye care practitioner's premises or a spectacle lens retailer shop, where the existing spectacle lens is arranged in a spectacle frame, for carrying out a diagnostic step of the existing spectacle lens prior removing any existing coating of said existing spectacle lens and prior adding the chosen functional coating on an optical surface and wherein the quality of the optical surface is analyzed and the features of the optical surface are identified, the computer process comprising successive steps of:
   determining, thanks to the diagnostic step, if identified features of an optical surface of the existing spectacle lens where the features of said optical surface are unknown, are compatible with a chosen functional coating according to a first set of rules, the features of the optical surface identified based on an analysis of a quality of the optical surface, the first set of rules based on a relationship of a list of a plurality of optical surface features to a list of a plurality functional coatings; and
   generating manufacturing information for the chosen functional coating based on the determined compatibility, the manufacturing information including information for depositing the chosen functional coating on the optical surface where the identified features are compatible with the chosen functional coating and on a modified optical surface where the identified features are not compatible with the chosen functional coating, the modified optical surface determined according to a second set of rules.

13. A method for adding a chosen functional coating on an optical surface of an existing spectacle lens where the features of said optical surface are unknown, the method being implemented in an eye care practitioner's premises or a spectacle lens retailer shop, the method comprising successive steps of:
   receiving the existing spectacle lens in a spectacle frame;
   carrying a diagnostic step of the existing spectacle lens prior removing any existing coating of said existing spectacle lens and prior adding the chosen functional coating on an optical surface and wherein the quality of the optical surface is analyzed and the features of the optical surface are identified;
   depositing the chosen functional coating based on a determination, thanks to the diagnostic step, of whether identified features of the optical surface are compatible with the chosen functional coating according to a first set of rules based on a relationship a plurality of optical surface features with a plurality of functional coatings, the chosen functional coating deposited on the optical surface where the identified features are compatible with the chosen functional coating or deposited on a modified optical surface formed on the optical surface where the identified features are not compatible with the chosen functional coating.

14. The method of claim 13 further comprising:
protecting the spectacle frame before depositing the chosen functional coating; and
removing the protection from the spectacle frame after depositing the chosen functional coating.

15. The method of claim 13 further comprising:
evaluating a performance of the deposited chosen functional coating.

16. The method of claim 13, wherein the modified optical surface is formed by depositing a primer coating on the optical surface based on the chosen functional coating.

17. The method of claim 16, wherein the spectacle lens is treated with plasma prior to depositing the primer coating.

18. The method of claim 13, wherein the modified optical surface is determined according to a second set of rules to be compatible with the chosen functional coating.

19. The method of claim 13, wherein the chosen functional coating includes at least one of: an anti-soiling coating, an anti-reflective coating, an anti-dust coating, an anti-fog coating, a water repellent coating, an anti-scratch coating, an impact-resistant coating, an interferential filter, a tinted coating, a mirror coating, a photochromic coating, a polarized coating, or a filter coating.

20. The method of claim 13, wherein the chosen functional coating is deposited on the optical surface using a lens coating machine.

* * * * *